United States Patent [19]
Ehni, III

[11] 3,809,994
[45] May 7, 1974

[54] LOW POWER DC-DC CONVERTER EMPLOYING INTERMITTENT BURSTS OF BLOCKING OSCILLATIONS

[75] Inventor: George J. Ehni, III, Dallas, Tex.
[73] Assignee: Texas Instruments Incorporated, Dallas, Tex.
[22] Filed: June 19, 1972
[21] Appl. No.: 263,920

[52] U.S. Cl.............. 321/2, 331/112, 331/181, 336/133, 336/134
[51] Int. Cl. ........................................... H02m 3/28
[58] Field of Search ........... 321/2; 331/181 X, 112; 336/133, 134, 135

[56] References Cited
UNITED STATES PATENTS

| | | | |
|---|---|---|---|
| 3,327,244 | 6/1967 | Fay et al. | 321/2 X |
| 3,550,053 | 12/1970 | Carlo | 336/135 X |
| 3,146,418 | 8/1964 | Maeda | 336/135 X |
| 3,593,244 | 7/1971 | Meindl et al. | 336/135 X |

Primary Examiner—Gerald Goldberg
Attorney, Agent, or Firm—Harold Levine; James T. Comfort; James O. Dixon

[57] ABSTRACT

A battery powered electronic liquid crystal display includes converter circuitry for providing a d.c. voltage suitable for driving the liquid crystal display from a low voltage battery source. The converter includes a transformer having a variable inductance such that the output level can be controlled. In a preferred embodiment the transformer includes a cup core having mating halves. Notches or recesses are defined in a significant portion of the peripheral edge of each cup core component; thus the stored energy of the transformer can be varied by rotating one half of the cup core pair with respect to the other half.

3 Claims, 5 Drawing Figures

LOW POWER DC-DC CONVERTER EMPLOYING INTERMITTENT BURSTS OF BLOCKING OSCILLATIONS

The present invention pertains to d.c. to d.c. converters in general and more particularly to a converter including a transformer having a cup core, the inductance of which is variable thereby providing a d.c. converter operable from a convention low voltage battery source and effective to produce a controllable output voltage level suitable for energizing a liquid crystal display of a battery powdered electronic wrist watch.

Low powered electronically controlled timekeeping devices have been described in the literature. For example, one such device is described in U.S. Pat. No. 3,560,998. It has also been suggested to utilize liquid crystal displays in a solid state watch. Reference for example U.S. Pat. No. 3,505,804. Numerous technical problems have been encountered, however, in attempting to provide a commercial electronic liquid crystal wrist watch. These problems include the difficulty of achieving sufficient liquid crystal lifetime when d.c. voltages are applied to the liquid crystal electrodes. At present, sufficient lifetime may be obtained using a.c. voltages but difficulty still persists with d.c. embodiments. Also, present electronic watches typically include only indication of hours, minutes and seconds. It is difficult to provide a watch having a calendar that can easily be set; for example, to set back the time after the date has been incremented without again incrementing the date.

There have been proposals which suggest utilizing CMOS (complementary metal oxide semiconductor) technology in combination with liquid crystal displays primarily due to the power savings capability of such a configuration. Certain advantages, however, may be obtained utilizing bipolar technology for implementing the circuit logic; however, readily available battery sources provide on the order of 1 volt and it is exceedingly difficult to implement logic with bipolar integrated circuits suing such voltage levels. Additional limitations are imposed due to integration requirements, these primarily being that it is difficult to obtain large resistances in integrated circuit format.

Accordingly, an object of the present invention is the provision of a d.c. to d.c. convertor operable from conventional low voltage batteries. A further object of the invention is a d.c. to d.c. convertor having a variable output voltage suitable for providing sufficient voltage output to energize the liquid crystal display of a battery powered electronic wrist watch.

More particularly, in accordance with the invention, a d.c. to d.c. convertor includes an input terminal for receiving a first relatively low voltage supply typically on the order of 1.35 volts and an output terminal for providing a relatively large voltage on the order of 15 volts for providing an output to the liquid crystal display elements of a wrist watch. The input voltage is coupled to a blocking oscillator which includes a transformer and a transistor configuration. The transformer includes a cup core pair. Means are included for selectively controlling the inductance of the transformer to control the magnitude of the output voltage. In the preferred embodiment the means for controlling the inductance includes defining recesses or notches in the peripheral edge of each half of the transformer cup core pair. The two halves are then mounted together such that they may be rotated one with respect to the other providing a variable magnetic cross-sectional area which effectively changes the inductance of the transformer.

Other objects and advantages of the invention will be apparent upon reading the following detailed description of illustrative embodiments in conjunction with the drawings wherein:

FIG. 1 schematically illustrates a d.c. to d.c. convertor in accordance with the invention;

A detailed description of both the logic and the bipolar integrated circuit implementation thereof of the electronic wrist watch to which the present d.c. to d.c. converter has specific application occurs in copending U.S. Patent application, Ser. No. 264,212, filed June 19, 1972, the disclosure of which is incorporated herein by reference.

In accordance with the present invention, the DC to DC convertor receives an input from a low voltage battery, typically in the range of about 1.35 volts. The output is approximately the 15 volts required for operation of the liquid crystal display.

Figure 1:
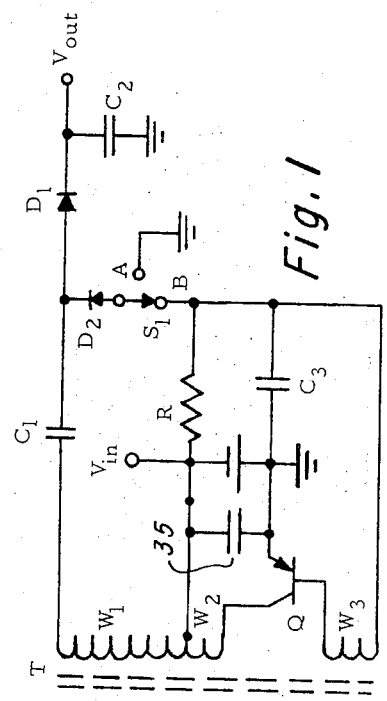

Referring specifically to the drawings, the convertor is schematically depicted in FIG. 1. Operation is as follows:

The transistor Q and transformer T form a basic blocking oscillator. The AC generated in the winding $W_1$ is peak-to-peak detected ("doubled") by capacitor $C_1$ and the two diodes $D_1$ and $D_2$. This is the output voltage and is stored in the output capacitor $C_2$.

For purposes of explanation, assume that there is a switch $S_1$ in the circuit as shown, with positions A and B.

If the switch is in the A position, the period between bursts of blocking oscillations will be set by the capacitor $C_3$ and resistor R. This may be shown as follows. Assume a small negative voltage at the base of the transistor Q, insufficient to bias the base into conduction. Current will flow from the battery ($V_{in}$) through the resistor, and in time will reach a value sufficient to bias the base into conduction. Because of the blocking oscillator configuration, the current flow now becomes regenerative. Current increases in both the base and collector circuits until the transformer core becomes saturated, at which time the base drive collapses and a regenerative turn off cycle is initiated. The collapsing field in the core induces a voltage in the output $W_1$ winding, and in the base $W_3$ winding. The voltage in the base winding is clipped by the detector action of the base-emitter junction of the transistor. This clipping action occurs during a period of operation when the transformer is on. After a few cycles of the blocking oscillation, the negative voltage stored in the capacitor $C_3$ is depleted to such an extent that the base of the transistor is again cut off. This completes a burst of the blocking oscillator. Current will again flow in the resistor and cause another burst in a given period of time. The time between bursts will be set by the resistor and base capacitor $C_3$ and by the amount of charge removed from the base capacitor by the detector action of the base.

If the switch is now placed in the B position, which is the way the circuit is actually implemented, the load regulation characteristics of the circuit can be examined. Operation is essentially as before, with one important difference. Each blocking burst tends to enhance the negative charge on the capacitor $C_3$ since the voltage doubler is referenced to the base capacitor. The circuit is load responsive, since the load current will serve to influence the base capacitor charge. A heavy load current will cause more negative charge to be placed in the base capacitor than a light load current, and the blocking burst will be longer. The circuit is thus load responsive.

Figure 3:
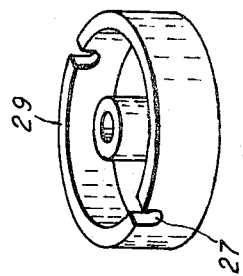
FIG. 3 is a perspective view of a conventional core member for a segmental two-piece transformer core of a transformer suitable for use in a d.c. to d.c. converter as schematically illustrated in FIG. 1.
Figure 4:
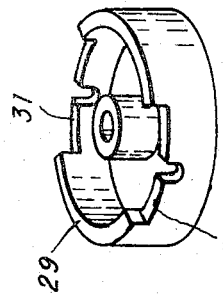
FIG. 4 is a perspective view of a transformer core segment for a segmental two-piece transformer core as constructed in accordance with the present invention.
Figure 5:
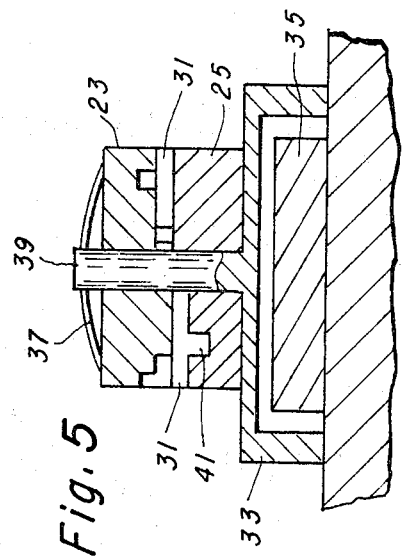
FIG. 5 is a cross-sectional illustration of the d.c. to d.c. convertor transformer illustrated in FIG. 1.

With reference to FIGS. 3-5, the convertor includes a cup transformer core having mating halves 23 and 25. Suitable core materials are known in the art. A conventional core half is illustrated in FIG. 3a. This core has a notch 27 for extracting leads. It will be noted that the peripheral edge surface 29 is flat. With reference to FIG. 4, the modification to the core half in accordance with the invention is illustrated. As may be seen, a portion of the peripheral edge is removed in regions 31. As illustrated, these recessed regions extend on both sides of the notch 27. Such a configuration is not essential, and the recessed regions may be formed in other locations around the periphery as desired.

Maximum inductance, and hence minimum convertor cycle rate and lowest voltage, occurs with the peripheral flats of the two halves in alignment. Minimum inductance, as a result of minimized magnetic cross sectional area, and hence higher peak primary currents and repetition frequency and highest output voltage occurs when the flats 29 of one half are opposite the notched areas 31 of the other half. Wide variations in voltage are possible with the technique and control is smooth throughout the range.

Due to fixed core loses and minimum losses in the air gap, the convertor exhibits practically the same efficiency at any output level.

The requirements of the wrist watch system dictate that a large capacitor 35 be mounted beneath the transformer. Therefore, in a preferred embodiment, a plastic saddle 33 is used to straddle the capacitor and mount the transformer.

The transformer may be assembled on the saddle, and a "speed nut" type clip 37 pushed down over the protruding end of a mounting post 39 on top of the saddle. The clip provides the necessary pressure to hold the two core halves tightly together. This advantageously provides a low profile structure.

The post 39 on the back (top) of the saddle can be fabricated with a small amount of "mold relief" angle (taper) so that the lower core half fits snuggly, and the top half is free to rotate as necessary. Wires exit the notch 41 in the lower half.

Figure 2:
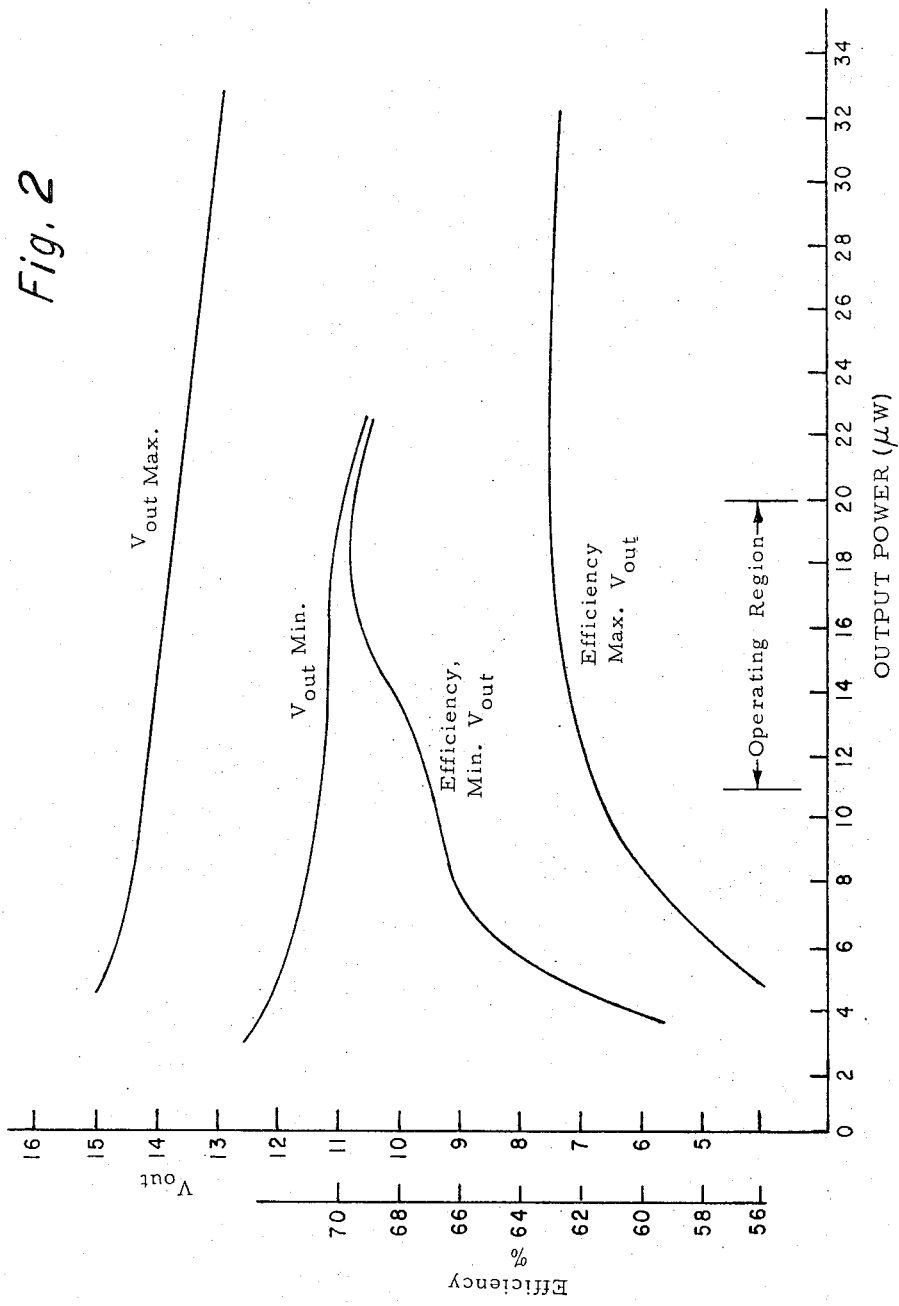
FIG. 2 depicts curves illustrating the voltage tuning range and efficiency of the convertor in FIG. 1.

With reference to FIG. 2, the output characteristics of the d.c. to d.c. convertor illustrated in FIG. 1 are illustrated. The circuit had a 1.365 V input. Winding $W_1$ had 130 turns and $W_2$ and $W_3$ each had 30 turns. The curves show output voltage tuning range, efficiency and power requirements.

While a specific embodiment of the invention of been described in detail herein, it will be apparent to those skilled in the art that various changes may be made without departing from the spirit or scope of the invention.

What is claimed is:

1. A d.c. to d.c. converter comprising:
   an input terminal for receiving a first relatively low voltage supply and an output terminal for providing a second relatively large voltage;
   blocking oscillator means connected to said input and output terminals comprising a transformer including a core and base and output windings, and a transistor coupled to said base and output windings,
   said transistor having base, collector, and emitter electrodes with the base and collector electrodes thereof being connected into said base and output windings respectively of said transformer,
   voltage doubler means connected to said output winding for detecting the alternating current generated therein to produce an output voltage, and
   storage means connected to said voltage doubler means for receiving the output voltage produced thereby for storage.

2. A d.c. to d.c. converter as set forth in claim 1, further including a base capacitor, said base capacitor being connected to the emitter electrode of said transistor at one terminal and to the base winding of said transformer at the other terminal thereof, and
   said voltage doubler means being referenced to said base capacitor, whereby the base capacitor charge is variable in direct relation to the load current such that the d.c. to d.c. converter is load responsive.

3. A d.c. to d.c. converter as set forth in claim 1, wherein said transformer has a segmental core comprising a pair of cup core members of magnetic or electrically conductive material,
   the first of said pair of cup core members being cylindrical and presenting a substantially flat peripheral circular edge to the second cup core member, a significant portion of said flat peripheral circular edge defining a recessed surface in which an axially extending notch is provided,
   the second of said pair of cup core members being cylindrical, said second cup core member being mounted in opposed spaced relation to first cup core member and presenting a substantially flat peripheral circular edge thereto, a significant portion of said flat peripheral circular edge of said second cup core member defining a recessed surface in which an axially extending notch is provided, and means mounting said first and second cup core members for relative rotation therebetween such that rotation of one cup core member with respect to the other cup core member will adjust the inductance of said transformer to provide selective control thereof for regulating the magnitude of the output voltage therefrom.

* * * * *